(12) United States Patent
Prudent (10) Patent No.: US 8,363,631 B2
(45) Date of Patent: *Jan. 29, 2013

(54) NAVIGATION WITHIN A WIRELESS NETWORK

(75) Inventor: Shroeder Prudent, Brooklyn, NY (US)

(73) Assignee: Verizon New York Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/690,472

(22) Filed: Jan. 20, 2010

(65) Prior Publication Data

US 2010/0118728 A1 May 13, 2010

Related U.S. Application Data

(63) Continuation of application No. 11/043,367, filed on Jan. 26, 2005, now Pat. No. 7,660,284.

(60) Provisional application No. 60/541,164, filed on Feb. 2, 2004.

(51) Int. Cl.
*H04Q 7/24* (2006.01)

(52) U.S. Cl. ........ 370/338; 370/412; 370/400; 370/320; 370/335; 370/328; 370/331; 370/329; 370/409; 370/356; 455/425; 455/411; 455/423; 455/514; 455/403

(58) Field of Classification Search .................. 370/412, 370/400, 320, 335, 235, 338, 328, 251, 329, 370/331, 409, 356, 352, 401, 389, 254, 255, 370/351; 709/248; 455/425, 411, 423, 514, 455/67.11, 12.1, 434, 403, 414.1, 456, 404.2, 455/414.2, 426.1, 433, 445

See application file for complete search history.

(56) References Cited

U.S. PATENT DOCUMENTS

| | | | |
|---|---|---|---|
| 3,742,144 A | 6/1973 | Brandenburg et al. | |
| 5,572,528 A | 11/1996 | Shuen | |
| 5,940,771 A | 8/1999 | Gollnick et al. | |
| 6,097,960 A | 8/2000 | Rathnasabapathy et al. | |
| 6,112,082 A * | 8/2000 | Almgren et al. | 455/425 |
| 6,205,488 B1 | 3/2001 | Casey et al. | |
| 6,208,629 B1 | 3/2001 | Jaszewski et al. | |
| 6,317,431 B1 | 11/2001 | Hodgkinson et al. | |
| 6,335,930 B1 | 1/2002 | Lee | |
| 6,339,707 B1 | 1/2002 | Wainfan et al. | |
| 6,490,256 B1 | 12/2002 | Jones et al. | |
| 6,570,692 B2 | 5/2003 | Doucet et al. | |
| 6,574,481 B1 | 6/2003 | Rathnasabapathy et al. | |
| 6,683,865 B1 | 1/2004 | Garcia-Luna-Aceves et al. | |
| 6,735,190 B1 | 5/2004 | Chuah et al. | |
| 6,798,757 B2 * | 9/2004 | Mizutani et al. | 370/329 |
| 6,904,275 B2 | 6/2005 | Stanforth | |
| 7,032,033 B1 * | 4/2006 | Ledoux et al. | 709/248 |
| 7,068,624 B1 * | 6/2006 | Dantu et al. | 370/331 |
| 7,079,853 B2 | 7/2006 | Rathnasabapathy et al. | |
| 7,298,743 B2 * | 11/2007 | Markki et al. | 370/392 |
| 7,664,073 B2 * | 2/2010 | Vesterinen et al. | 370/331 |
| 2001/0010490 A1 | 8/2001 | Bellin | |
| 2002/0006133 A1 | 1/2002 | Kakemizu et al. | |
| 2002/0013759 A1 | 1/2002 | Stewart et al. | |
| 2002/0019797 A1 | 2/2002 | Stewart et al. | |
| 2002/0030864 A1 | 3/2002 | Chaudhuri et al. | |
| 2002/0056114 A1 | 5/2002 | Fillebrown et al. | |
| 2002/0109879 A1 | 8/2002 | Wing So | |
| 2002/0126633 A1 * | 9/2002 | Mizutani et al. | 370/329 |
| 2002/0141020 A1 | 10/2002 | Doucet et al. | |
| 2002/0156693 A1 | 10/2002 | Stewart et al. | |
| 2002/0167960 A1 | 11/2002 | Garcia-Luna-Aceves | |

(Continued)

*Primary Examiner* — Joseph Arevalo (57) ABSTRACT

A wireless is registered in a first wireless router by storing information in the first wireless router, a message is created comprising a unique identifier for the wireless device and a unique identifier for the first wireless router; the message is transmitted to at least one second wireless router.

10 Claims, 6 Drawing Sheets

U.S. PATENT DOCUMENTS

| | | | |
|---|---|---|---|
| 2002/0191593 A1 | 12/2002 | O'Neill et al. | |
| 2003/0007464 A1 | 1/2003 | Balani | |
| 2003/0026268 A1 | 2/2003 | Navas | |
| 2003/0033265 A1 | 2/2003 | Cabana et al. | |
| 2003/0037167 A1 | 2/2003 | Garcia-Luna-Aceves et al. | |
| 2003/0045241 A1* | 3/2003 | Noerpel et al. | 455/67.1 |
| 2003/0045295 A1 | 3/2003 | Stanforth | |
| 2003/0067892 A1 | 4/2003 | Beyer et al. | |
| 2003/0095504 A1 | 5/2003 | Ogier | |
| 2003/0128690 A1 | 7/2003 | Elliott et al. | |
| 2003/0158839 A1 | 8/2003 | Faybishenko et al. | |
| 2003/0169719 A1* | 9/2003 | Isobe et al. | 370/338 |
| 2003/0176196 A1 | 9/2003 | Hall et al. | |
| 2003/0179742 A1 | 9/2003 | Ogier et al. | |
| 2003/0182445 A1* | 9/2003 | Smith et al. | 709/238 |
| 2003/0187812 A1 | 10/2003 | Theimer et al. | |
| 2003/0235175 A1 | 12/2003 | Naghian et al. | |
| 2004/0004967 A1 | 1/2004 | Nakatsugawa et al. | |
| 2004/0066777 A1* | 4/2004 | Vesterinen et al. | 370/352 |
| 2004/0117508 A1* | 6/2004 | Shimizu | 709/249 |
| 2004/0141488 A1* | 7/2004 | Kim et al. | 370/338 |
| 2004/0203558 A1* | 10/2004 | Suzuki et al. | 455/403 |
| 2004/0213257 A1* | 10/2004 | Abdelilah et al. | 370/395.1 |
| 2004/0259571 A1 | 12/2004 | Joshi | |
| 2005/0157735 A1* | 7/2005 | Kan et al. | 370/412 |
| 2005/0163134 A1* | 7/2005 | Cheon | 370/401 |
| 2005/0164677 A1* | 7/2005 | Tsutsui | 455/411 |
| 2005/0188092 A1* | 8/2005 | Short et al. | 709/227 |
| 2005/0195795 A1* | 9/2005 | Aoki et al. | 370/351 |
| 2005/0226197 A1* | 10/2005 | Reddy et al. | 370/338 |
| 2006/0002297 A1* | 1/2006 | Sand et al. | 370/235 |
| 2006/0026017 A1* | 2/2006 | Walker | 705/1 |
| 2006/0109853 A1* | 5/2006 | Matsuzawa et al. | 370/400 |
| 2006/0182119 A1* | 8/2006 | Li et al. | 370/395.52 |

* cited by examiner

Fig. 4
Grid CreationProcess Flow--
Initial Router

Fig. 5

Grid Creation Process Flow--
Next Link Router

Fig. 6
Device Migration Process Flow

Destroy Grid After New Grid Creation
Fig. 7

Grid Destruction Process Flow
by an Edge Router

Fig. 8

NAVIGATION WITHIN A WIRELESS NETWORK

RELATED APPLICATIONS

This application is a continuation of U.S. patent application Ser. No. 11/043,367, filed on Jan. 26, 2005, which claims priority to U.S. Provisional Patent Application Ser. No. 60/541,164, filed Feb. 2, 2004, the contents of which are hereby incorporated by reference in its entirety.

FIELD OF THE INVENTION

This application relates generally to wireless communications systems and methods. More particularly, this application relates to systems and methods for wireless networking.

BACKGROUND OF THE INVENTION

Presently, wireless, or "WIFI", "hot spots" are used to enable wireless devices such as laptop computers, personal digital assistants (PDAs), hand-held computers, etc., to connect to networks such as the Internet. Various known standards for wireless communications, such as IEEE 802.11, Bluetooth, cellular networks, etc., are used for such wireless connectivity. Thus, present systems and methods enable users of wireless devices to connect to wireless routers at various geographic locations, such wireless routers in turn being connected to a network such as the Internet.

However, present systems and methods for connecting wireless devices to a network suffer from a number of shortcomings. First, a particular wireless device may be connected to the Internet or other network only when within the area of coverage of a wireless hot spot. Most wireless hot spots extend for only a few hundred feet. Thus, when the user takes the wireless device outside a particular wireless hot spot's area of coverage, the user loses connectivity to the Internet or other network. Further, present systems require the wireless router to which a wireless device connects to be connected to the Internet via a wired broadband connection, although there are generally significant costs associated with such a broadband Internet connection. Moreover, present users of wireless devices have no way of easily moving from one wireless hot spot to another. Presently, a user wishing to move from one wireless hot spot to another must manually log off the first wireless hot spot, and manually log into, or somehow register with, the second wireless hot spot.

Accordingly, it would be desirable for users of wireless devices to be able to access a wireless network that was not limited to the area of coverage of a single wireless router. Further, it would be advantageous if such a wireless network did not require a wireless device to be connected to a wireless router that was directly connected to the Internet or some other network. Moreover, it would be advantageous for such a wireless network to allow users to seamlessly and transparently, (i.e., automatically from the perspective of the user) move their wireless devices from an area covered by one wireless router to an area covered by a second wireless router.

Further, it is possible that a wireless network could be so large, including so many nodes, that it would not be not efficient to have every router within the network store information about every wireless device within the network. Accordingly, it would be desirable to have a wireless grid that allows a group of routers in the proximity of a wireless device to recognize the wireless device so that the wireless device does not suffer loss of communications, and does not have to initiate a log-in, when moving from one location to another, while at the same time not utilizing memory and other resources in wireless routers outside of the grid.

BRIEF SUMMARY OF THE INVENTION

A wireless device is registered in a first wireless router by storing information in the first wireless router. A message is created comprising a unique identifier for the wireless device and a unique identifier for the first wireless router. The message is transmitted to at least one second wireless router.

Some embodiments further include a propagate variable, the propagate variable identifying a distance measured by a number of wireless routers, each of the wireless routers selectively placed directly or indirectly in contact with one another such that the propagate variable can be transmitted between each of the wireless routers. Some embodiments further include the propagate variable decremented in the at least one second wireless router. Some embodiments further include the propagate variable included in the message. Some embodiments further include the message, including the decremented propagate variable, transmitted to at least one third wireless router if the value of the propagate variable is greater that zero.

Some embodiments further include the at least one second wireless router as a plurality of wireless routers.

Some embodiments further include the at least one second wireless router connected to a wired network. In some embodiments, the wired network is the Internet.

Some embodiments further include stored information included in the second message in the at least one second router.

Some embodiments further include the message further comprising a destroy variable.

DETAILED DESCRIPTION

I. Overview

A plurality of fixed routers can be geographically deployed in a generally regular manner so as to suggest a "grid" of such routers. A user of a mobile, wireless device or telephone, traveling through the geographical area of this grid, can communicate within and beyond this grid by having the wireless device under control of one of the routers in the grid (known as the control router). The control router establishes a sphere of influence which is an area around that router and in which the device experiences a signal strength from that router which exceeds the signal strengths of any other router in the grid. All communication to and from that wireless device goes through its control router.

At least one of the other routers in the grid can be a gateway router allowing communication between the mobile, wireless device through at least its control router and a network outside of the grid, such as the Internet. There are also "edge" routers, essentially defining the edge of the grid. As the mobile user travels through the geographical area of the grid another router within the grid may take over as what may be referred to as the receiving router. In other words, a control hand-off may take place within the grid from a control router to a receiving router where the receiving router's signal strength becomes greater than the control router's signal strength. This can be repeated within the grid as the various routers take their turn as the receiving router.

Eventually, as the wireless traveler approaches a boundary of the grid whereby an edge router is brought into the communication loop, a new grid may be initiated in accordance with principles of the present invention. As the new grid is created, the original grid is dissolved as depicted in the flowcharts and discussion thereof below. The wireless user then is traveling in the new grid in which he or she communicates via a new control router in that new grid. The principles of the present invention then apply to operation of the wireless device traveling within the new grid, just as they applied in the original grid, until yet another grid is created and the second grid is dissolved. This scenario of creating new grids and dissolving old ones can be repeated as often as may be required as a function of distance traveled by the wireless device user.

Figure 1:
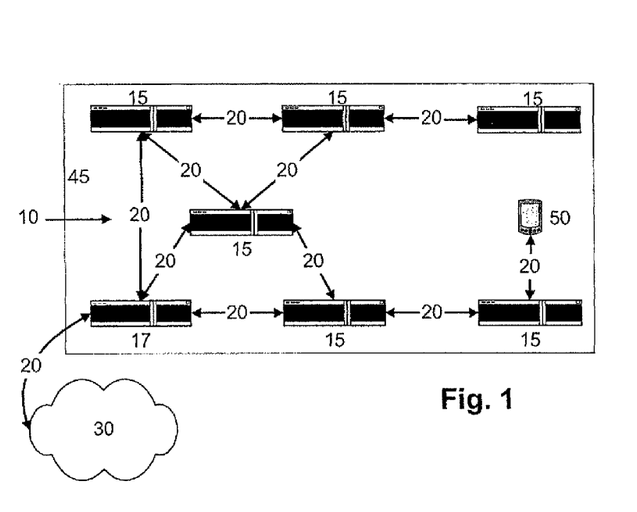
FIG. 1 is a diagram showing a wireless networking system, according to an embodiment.

FIG. 1 depicts a wireless network 10, including fixed wireless routers 15 and a wireless border gateway 17. Fixed wireless routers 15 use known wireless technology to route data packets to each other via wireless connections 20 and also to route data packets to wireless devices 50. Wireless connections 20 are generally radio frequency (RF) transmissions according to a known wireless standard such as 802.11 or Bluetooth. Fixed wireless routers 15 are similar to existing wireless routers, although they are not connected to a wired network, e.g., the Internet. Wireless border gateway 17 includes the functionality of fixed wireless routers 15, and also is connected to a network 30, such as the Internet generally via a wired connection 22, although embodiments are possible in which wireless border gateway 17 is connected to the Internet via a wireless connection 20. Wireless device 50 may include laptop computers, PDAs, handheld computers, or other wireless devices such as will be known to those skilled in the art.

Although FIG. 1 shows one wireless border gateway 17, it should be understood that in most embodiments, a plurality of wireless border gateways 17 will be deployed. Similarly, FIG. 1 shows one wireless device 50, but it is contemplated that a plurality of wireless devices 50 will simultaneously access a wireless network 10. Further, it should be understood that the number of fixed wireless routers 15 shown in FIG. 1 is purely a matter of convenience and in most embodiments a much greater number of fixed wireless routers 15 will be deployed. From FIG. 1, it can be seen that wireless networking system 10 advantageously allows a wireless device 50 to be connected to a network 30 such as the Internet without having a direct connection to a wireless border gateway 17, thus minimizing the number of costly connections to the network 30 that are needed.

The structure and operation of fixed wireless routers 15 and wireless border gateway 17 will be described in more detail below. However, it should be understood that each fixed wireless router 15 must be located such that it is capable of sending and receiving data packets from at least one other fixed wireless router 15. Further, each fixed wireless router 15 must be capable of transmitting and receiving data packets to and from a wireless border gateway 17, whether directly or indirectly, i.e., directly, or through one or more other fixed wireless routers 15. In general, fixed wireless routers 15 and/or wireless border gateways 17 should be positioned or located so as to provide complete coverage of a geographic area, e.g., a city or part of a city. Such positioning or locating of fixed wireless routers 15 and/or wireless border gateways 17 is further discussed below with reference to FIG. 2.

Fixed wireless routers 15 and wireless border gateways 17 may use known methods for routing data packets through a network. Such methods include, but are by no means limited to, link state routing, distance vector routing, static routing between fixed routers, and Open Shortest Path First (OSPF) for finding a shortest path.

Figure 2:
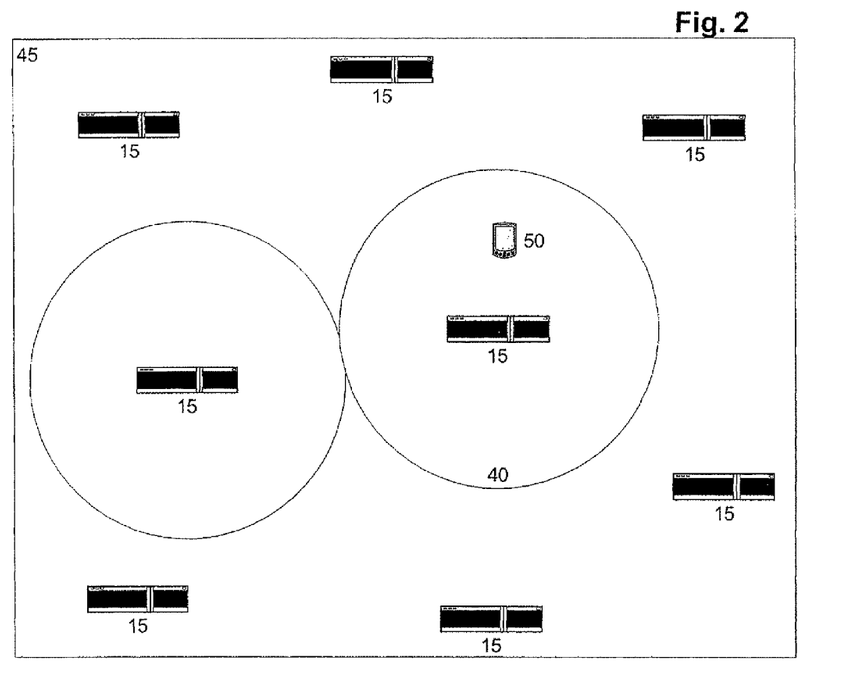
FIG. 2 is a partial view of a wireless networking system showing spheres of influence, according to an embodiment.

FIG. 2 provides a partial view of wireless network 10, depicting a wireless grid 45 that includes a subset of the wireless routers 15 in wireless network 10. Fixed wireless routers 15 are shown arranged to provide continuous coverage for wireless devices 50 in grid 45. A wireless device 50 is shown in what is referred to as the "sphere of influence" 40 of a particular fixed wireless router 15. A sphere of influence 40 potentially extends as far as the distance over which a fixed wireless router 15 is capable of sending messages to and receiving messages from a wireless device 50. A wireless device 50 is said to be within the sphere of influence 40 of a particular fixed wireless router 15, when that particular fixed wireless router 15 is providing an RF signal that is stronger from the perspective of the wireless device 50 than the signal that may be received from any other fixed wireless router 15. The determination of whether a wireless device 50 is within the sphere of influence 40 of a router 15 takes into account the possibility that different routers 15 in the grid 45 may be transmitting signals at different power levels, and that certain of the router-wireless device transmission pathways may be more obstructed than others. In other words, if transmission power levels and router-wireless device transmission pathways for all of the routers 15 in the grid 45 are substantially equal from router 15 to router 15, the closest router 15 to the wireless device 50 should have the strongest signal as perceived by the wireless device 50; but if those power levels and transmission pathways vary from router 15 to router 15 in the grid 45, the router 15 with the strongest signal as perceived by the wireless device 50 may not always be the closest router 15 to the wireless device 50.

When a fixed wireless router 15 has a wireless device 50 within its sphere of influence 40, that fixed wireless router 15 is referred to as the control router of the wireless device 50.

Those skilled in the art will recognize that there are various ways in which a fixed wireless router 15 could determine that a wireless device 50 is within its sphere of influence 40, i.e., that it is the control router for the wireless device 50. In one embodiment, upon receipt of a signal from wireless device 50, each router 15 receiving the signal sends a control message to its next link router(s). Each control packet contains the signal strength of the signal received in its respective router 15 from the wireless device 50. Accordingly, each router 15 can be programmed to determine, based on the information contained in control packets sent to and received from next link routers, whether or not it is the control router for the wireless device 50.

It should be understood that each of routers 15 and 17 periodically send packets containing control messages containing information needed by other routers 15 and/or 17. For example, control messages are generally sent from each one of the routers 15 that are control routers to a wireless border gateway 17 (used to transmit messages from the wireless device 50 to the network 30, e.g., the Internet), thereby providing a list of all wireless devices 50 for which it (the sending router 15 or 17) is the control router.

II. Message Recognition Packets

Figure 3:
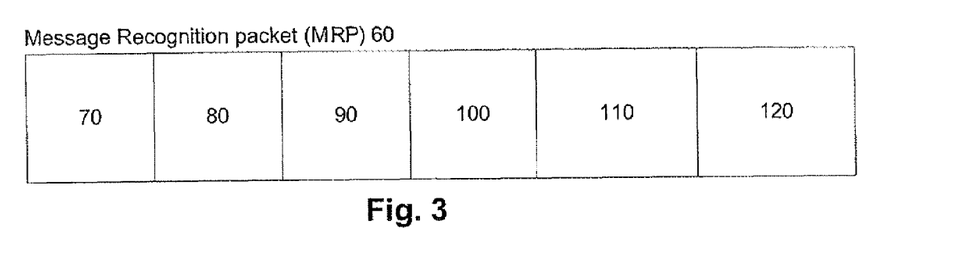
FIG. 3 is a diagram of a Message Recognition Packet, according to an embodiment.

FIG. 3 is a diagram of a Message Recognition Packet (MRP) 60, having fields 70, 80, 90, 100, 110, and 120, according to an exemplary embodiment. It should be understood that other kinds of data packets having other fields than those described herein would be consistent with the spirit and scope of the systems and methods disclosed herein.

Field 70 is used to contain the Internet protocol (IP) address of a control router, i.e., a fixed wireless router 15 or a wireless border gateway 17, for a wireless device 50. IP addresses are well known to those skilled in the art.

Field 80 is used to contain the physical address, i.e., a unique identifier, for the control router of a wireless device 50. Various kinds of physical addresses or unique identifiers for hardware such as routers 15 and 17 and wireless devices 50 will be known to those skilled in the art.

Field 90 is used to contain the IP address of a wireless device 50.

Field 100 is used to contain the physical address, i.e., a unique identifier, for a wireless device 50.

Field 110 is used to contain an integer representing the value of what is referred to as a propagate variable. Propagate variables are described in more detail below.

Field 120 is a two-bit field containing what is referred to as a destroy variable. Destroy variables are described in more detail below. Possible values for the destroy variable include binary 00, meaning a grid has been established, binary 01, meaning that a new grid 45 has been built and an old grid 45 should be destroyed, and binary 10, meaning that the current grid should be destroyed.

III. Process Flows

Figure 4:
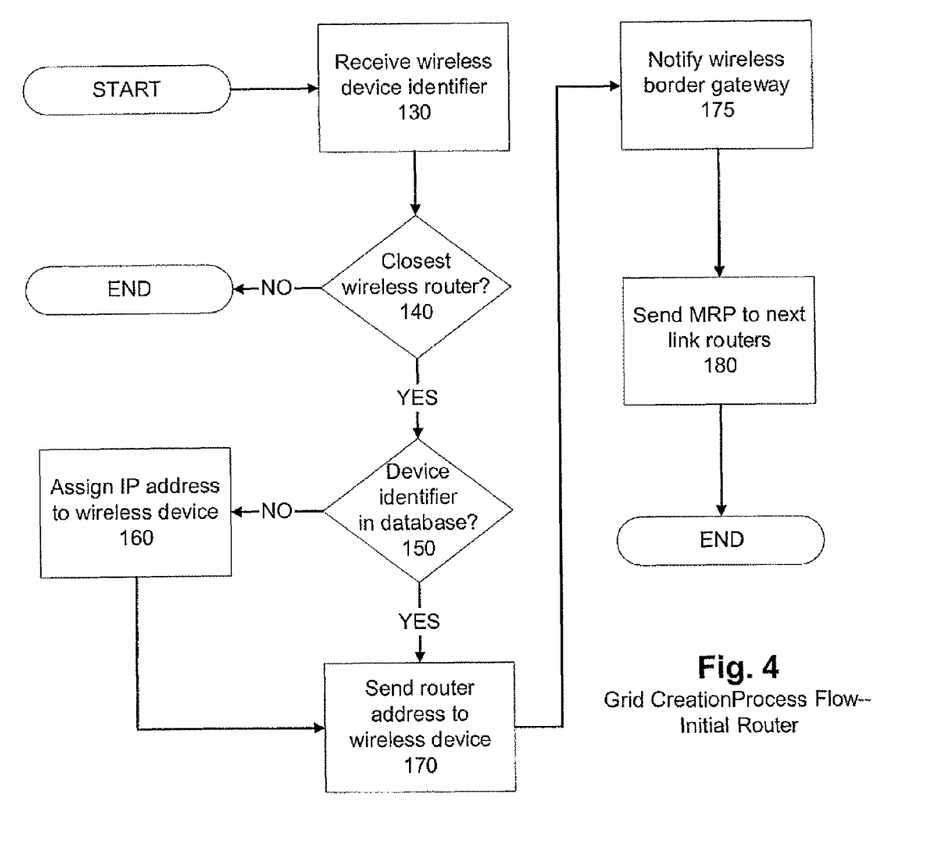
FIG. 4 is a process flow diagram showing the process flow for the creation of a wireless networking grid from the perspective of an initial router, according to an embodiment.

FIG. 4 is a process flow diagram showing the process of initiating the creation of a grid 45 within a wireless networking system 10 by a control router, according to an embodiment.

In step 130, a fixed wireless router 15 or a wireless border gateway 17 (e.g., any one of the routers 15 or gateways 17 depicted or represented in FIG. 1) receives a message from a wireless device 50 containing a unique identifier, i.e., physical address of the wireless device 50.

In step 140, that router 15 or 17 receiving the message determines whether or not it is the closest wireless router in wireless networking system 10 to the wireless device 50 that has sent the message, i.e., whether the wireless device 50 is within its sphere of influence 40 (i.e., whether the signal from this particular router 15 or 17 is the strongest R.F. signal of all the signals from all the routers in the grid as perceived by this wireless device 50). If it is not, the process ends. However, if that router 15 or 17 is the closest wireless router to the wireless device 50 that has sent the message, then control proceeds to step 150.

Before discussing step 150 below, it should be understood that a database will be maintained by every router 15 or 17. Each fixed wireless router 15 and wireless border gateway 17 maintains, in its respective database, or by some similar mechanism, a list of all wireless devices 50 for which it is the control router. Information stored with respect to a wireless device 50 generally includes an IP address assigned to the wireless device 50 as well as a physical address. Further, each wireless border gateway 17 maintains in its database a list of all wireless devices 50 for which that wireless border gateway 17 provides a connection to network 30, whether that wireless border gateway 17 is the control router for a given wireless device 50, or whether a fixed wireless router 15 in communication with the wireless border gateway 17 is the control router for a given wireless device 50.

In step 150, that router 15 or 17 determines whether the unique identifier received from the wireless device 50 is found in its database. If that router 15 or 17 cannot find the identifier for the wireless device 50 in its database, control proceeds to step 160. But, if the identifier for the device 50 is found in the database of that router 15 or 17, then the IP address assigned to the device 50 is also determined, and control proceeds to step 170.

In step 160, that router 15 or 17 assigns an IP address to the wireless device 50. Those skilled in the art will recognize that the IP address assigned to a wireless device 50 will enable messages to be sent to the wireless device 50 over a network 30 such as the Internet.

Generally, the address of a router 15 or 17 is the combination of the IP address and the physical address of the router 15 or 17. In step 170, that router 15 or 17 sends its address to the wireless device 50. The wireless device 50 can then include this information in an MRP 60 to identify that router 15 or 17 to which messages from the wireless device 50 should be sent. Control next proceeds to step 175.

Step 175 is only performed when the control router is a fixed wireless router 15, and is not necessary when the control router is a wireless border gateway 17 where control would proceed directly to step 180. In step 175, fixed wireless router 15 sends a message to a wireless border gateway 17. The identity and address of the particular wireless border gateway 17 to which a message is sent may be predetermined and programmed into fixed wireless router 15, although those skilled in the art will recognize that there are ways in which the wireless border gateway 17 could be dynamically determined. The message notifies that wireless border gateway 17 that that fixed wireless router 15 is the control router for the wireless device 50, and also provides the information needed to be included in an MRP 60. It is important that the control router provides identifying information, including, in one embodiment, its IP address and the physical address of the wireless device 50, to the wireless border gateway 17. This identifying information allows that wireless border gateway 17 to know which router 15 should receive messages from network 30 intended for the wireless device 50.

Upon receiving information from the control router, wireless border gateway 17 then makes an entry in its database containing the address of the wireless device 50 and its control router's IP address. Preferably, there is a timer associated with this entry such that it is erased if no messages are received identifying the wireless device 50 within a particular period of time. Control next proceeds to step 180.

In step 180, that router 15 or 17 sends an MRP 60 to certain other routers 15 or 17 that are referred to as next link routers. Some embodiments use static routing, such as will be known to those skilled in the art, in which a set of next link routers for a particular router 15 or 17 is predetermined and programmed into the router 15 or 17. Other embodiments use known dynamic routing methods such as those mentioned above. The MRP 60 that is sent to the next link routers will contain the IP address and physical address of the control router, the IP address and physical address of the wireless device 50, as well as values for the propagate and destroy variables.

The value of the propagate variable is predetermined, e.g., a wireless router 15 can be configured to set the propagate variable to a given value when acting as a control router, and indicates the depth of the grid 45. That is, the propagate variable controls the distance, measured by the number of routers 15 or 17, i.e., nodes in wireless networking system 10 that an MRP 60 can travel before reaching an edge, or boundary, of the grid 45. Put another way, the propagate variable controls the number of routers 15 and/or 17 through which an MRP 60 can travel before a router 15 or 17 will not propagate the MRP 60 to its next link routers. The use of the propagate variable is further described below.

The destroy variable is set to binary 00 when the MRP 60 is sent in step 180.

Following step 180, the process described with reference to FIG. 4 ends.

Figure 5:
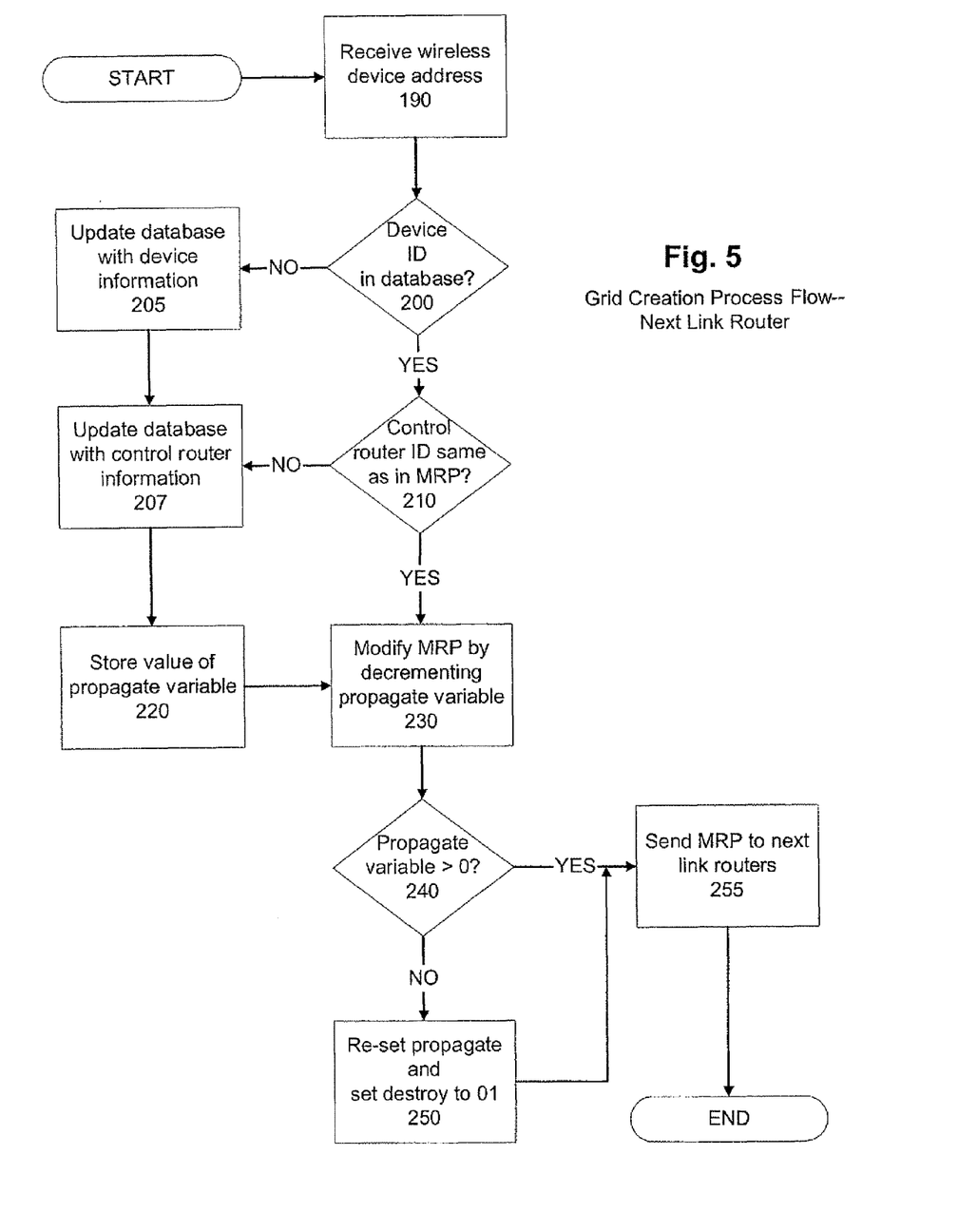
FIG. 5 is a process flow diagram showing the creation of a wireless networking grid from the perspective of a secondary or next link router, according to an embodiment.

FIG. 5 describes a process initiated according to an embodiment when a next link router receives an MRP 60 from a wireless router 15 or 17, according to an embodiment.

In step 190, a next link router, i.e., a router 15 or 17 as depicted or represented in FIG. 1, receives an MRP 60 containing, among the other fields described above, the address of a wireless device 50. Control then proceeds to step 200.

As noted above, each router 15 or 17 maintains in its respective database information concerning wireless devices 50 for which the router 15 or 17 is part of the grid 45 for wireless device 50. Also, as noted above, each wireless border gateway 17 maintains information about wireless devices 50 for which it is the gateway to a network 30 such as the Internet. Additionally, each router 17 maintains a list of wireless devices 50 for which it is included in a grid 45. Associated with the entry for each wireless device 50 in this database is information identifying the control router for the wireless device 50. In step 200, that router 15 or 17 checks to see if the wireless device 50 is identified in its database. If the wireless device 50 is not identified in the database of the router 15 or 17, control proceeds to step 205. Otherwise, control proceeds to step 210.

In step 205, that router 15 or 17 updates its database with the address of the wireless device 50. Control then proceeds to step 207.

In step 207 that router 15 or 17 updates its database with information from the MRP 60, including the address of the control router for the wireless device 50. Control then proceeds to step 220.

In step 210, that router 15 or 17 checks to determine if the address in its database for the control router matches the information contained in fields 70 and/or 80 of MRP 60. If not, control proceeds to step 207; otherwise, control proceeds to step 230.

In step 220, that router 15 or 17 stores the value of the propagate variable in its database and associates that value with the wireless device 50 identified in the MRP 60. Control then proceeds to step 230.

In step 230, that router 15 or 17 modifies the MRP 60 by decrementing the propagate variable, i.e., by subtracting one from the value of the propagate variable. Control then proceeds to step 240.

In step 240, that router 15 or 17 determines whether the value of the propagate variable is greater than zero. If it is not, control proceeds to step 250. If, however, the value of the propagate variable is greater than zero, then control proceeds to step 255.

In step 250, the value of the propagate variable is re-set to the predetermined value mentioned above with reference to step 180 in FIG. 4. Also, the value of the destroy variable is re-set to binary 01. A process initiated by re-setting the destroy variable to binary 01 is described below with reference to FIG. 8. Control then proceeds to step 255.

In step 255, that router 15 or 17 sends the MRP 60 to its next link routers. The process described with reference to FIG. 5 then ends.

Figure 6:
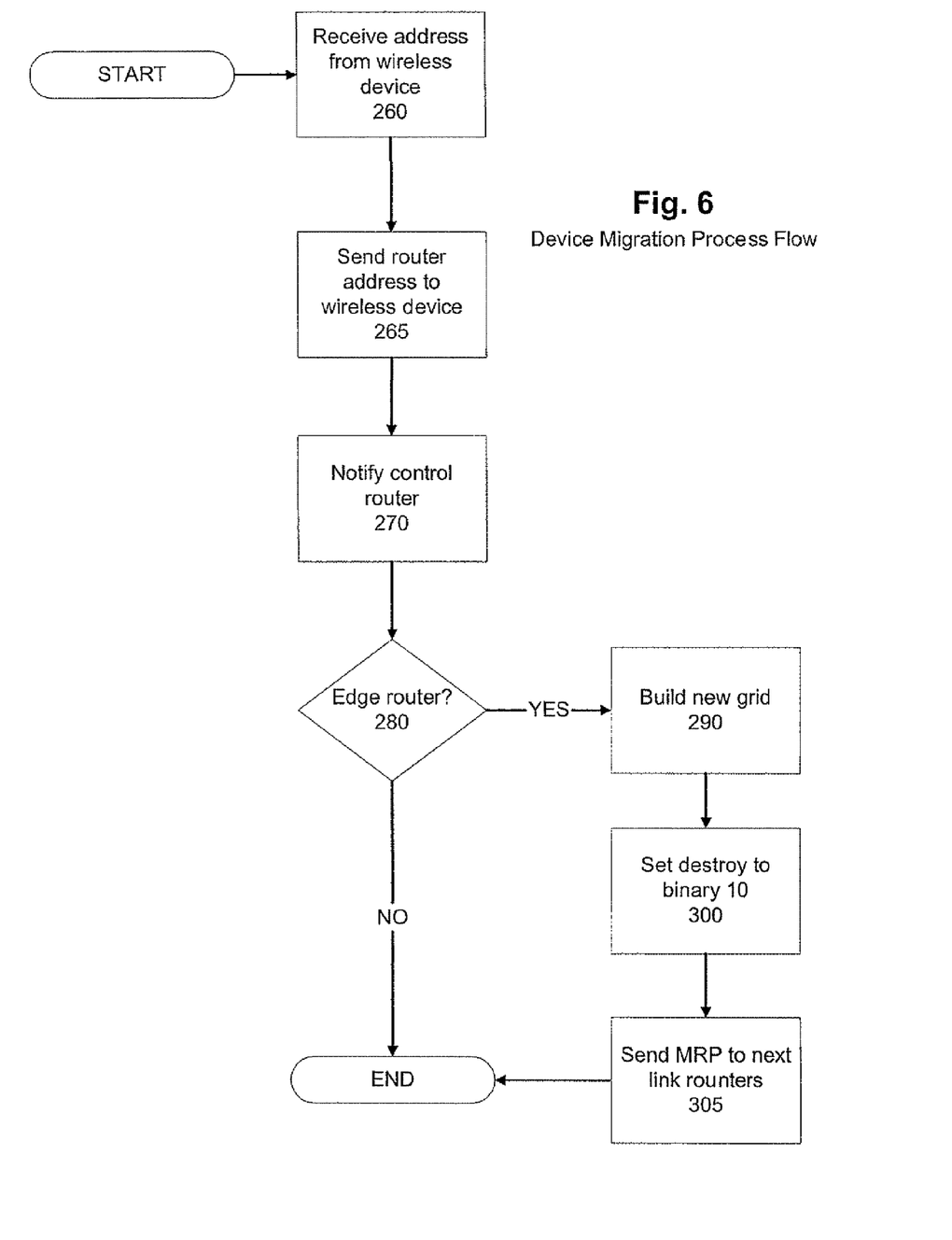
FIG. 6 is a process flow diagram showing the process flow for migrating a wireless device from one fixed router to another, according to an embodiment.

FIG. 6 is a process flow diagram showing the process initiated when a wireless device 50 migrates from one control router to another, according to an embodiment.

The process begins in step 260 when a router 15 or 17 receives an address, possibly contained in an MRP 60, but possibly also in some other kind of packet, from a wireless device 50 for which it may not be the control router. As described above, such a router may be termed a "receiving router". Control then proceeds to step 265.

In step 265, the receiving router 15 or 17 sends its address to the wireless device 50 from which the address of wireless device 50 was received in step 260. Control then proceeds to step 270.

In step 270, the receiving router 15 or 17 that has received an address from the wireless device 50 notifies the control router 15 or 17 that is the control router for the wireless device 50, that the receiving router 15 or 17 that received the address from device 50 in step 260 is servicing device 50, i.e. receiving and transmitting packets from and to device 50. It should be understood that a control router controls devices 50 and routers 15 and/or 17 within grid 45. However, the control router does not communicate with every device 50 within grid 45. That is, as explained above, devices 50 within the grid 45 communicate with the router 15 or 17 providing the strongest RF signal to wireless device 50. Once a router 15, or 17 establishes communication with a device 50, such router 15 or 17 must inform the control router for the grid 45 that it is now communicating with device 50. This step is necessary because all incoming messages for device 50 will come from a wireless border gateway router 17, which then sends such messages to the control router. The control router in turn needs to know to what router 15 or 17 to send the packets destined for device 50. Thus, whenever a router 15 or 17 is communicating with a device 50 it must notify the control router that it is servicing the device 50. Following step 270, control proceeds to step 280.

In step 280, the receiving router 15 or 17 that has received the address from a wireless device 50 determines whether or not it is an edge router. An edge router is a router that in step 240 of FIG. 5 determined that the value of the propagate variable was not greater than zero. Alternatively, the value of the propagate variable stored in step 220 of FIG. 5 could be checked in step 280 to determine whether or not the router 15 or 17 is an edge router. In practical terms, this means that the wireless device 50 is at or near the edge of the grid 45 within wireless networking system 10 that was established in the process described with respect to FIGS. 4 and 5. If the router is not an edge router, the process ends. If the router 15 or 17 is an edge router, then control proceeds to step 290.

In step 290, the router 15 or 17 initiates the process described with respect to FIG. 4, beginning with step 170. Further, once the router 15 or 17 sends an MRP 60 to its next link routers, the process described with respect to FIG. 5 is initiated, and a new grid 45 within wireless networking system 10 is constructed. Control next proceeds to step 300.

In step 300, the value of the destroy field 120 in MRP 60 is re-set to binary 10, indicating that the previous grid 45 for device 50 should be destroyed. A process for destroying a grid 45 when the value of the destroy field 120 in MRP 60 is set to binary 01 is described below with reference to FIG. 7.

In step 305, the receiving router 15 and/or 17 that received an address from wireless device 50 in step 260 sends an MRP 60 to each of its next link routers. The process described with reference to FIG. 6 then ends.

Figure 7:
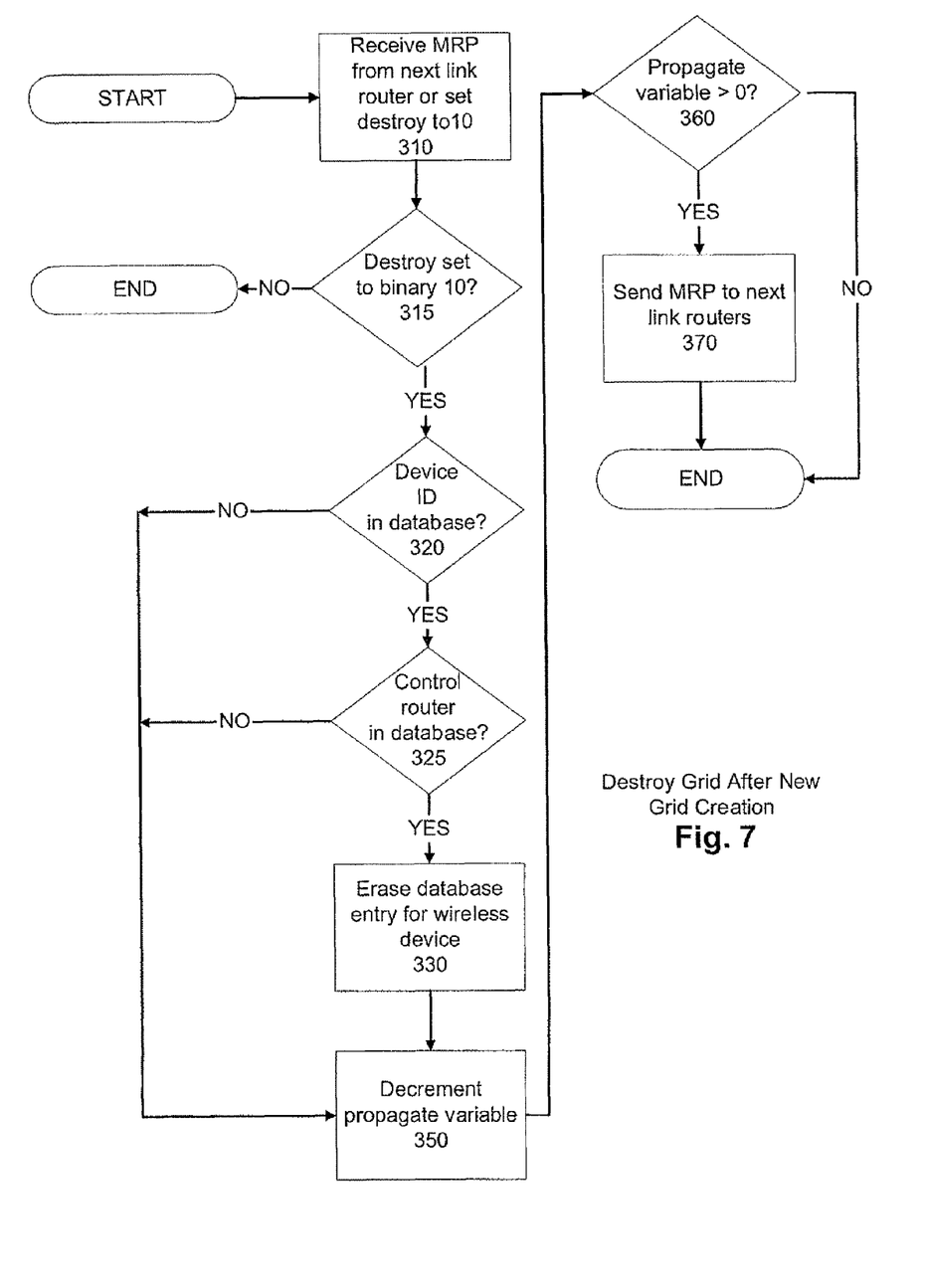
FIG. 7 is a process flow diagram showing the process flow for the destruction of a wireless networking grid after creating a new grid, according to an embodiment.

FIG. 7 is a process flow diagram showing the process of destroying a grid 45 according to an embodiment. The process flow of FIG. 7 is generally invoked to destroy a grid 45 for a device 50 when the control router for the device 50 has determined that the device 50 is inactive. For example, assume that a first router 15 or 17 is acting as control router for a device 50. If the device 50 ceases to communicate with the first router 15 or 17 for a period of time it is desirable to assume that the device 50 has gone out of service, been turned off, etc, because when the device 50 becomes active again it may communicate with a second router 15 or 17 that has no knowledge that the first router 15 or 17 is the control router for the device 50. Thus, the second router 15 or 17 will make itself the control router for the device 50 and will so inform wireless border gateway 17. Accordingly, the process flow of FIG. 7 is desirable to conserve resources in network system 10 and to ensure that only one router 15 or 17 is acting as the control router for a particular device 50 at a given time.

In step 310, a router 15 or 17 receives an MRP 60 containing an identifier for a wireless device 50. In some embodiments the control router, in step 310, may determine that device 50 has been or is being turned off, either by comparing the elapsed time since a message was last received from the device 50 to a predetermined amount of time, or because a message has been received from the device 50 indicating that the device 50 is being turned off. In these embodiments, rather than receiving an MRP 60 informing it that the grid 45 should be destroyed, the control router sets the value of the destroy variable to binary 10. Control then proceeds to step 315.

In step 315, it is determined whether the value of the destroy variable in the MRP 60 received in step 310 is set to binary 10, i.e., decimal 2, indicating that the grid should be destroyed. If it is not, the process described with reference to FIG. 7 ends. Otherwise, control then proceeds to step 320.

In step 320, the router 15 or 17 that received the MRP 60 in step 310 checks to see if the device 50 identified in the MRP 60 is in its database. If not, control proceeds to step 350. Otherwise, control proceeds to step 325.

In step 325, the router 15 or 17 that received the MRP 60 in step 310 checks to see if the database lists the router 15 or 17 identified as the control router in fields 70 and/or 80 of the MRP 60 as the control router for the wireless device 50. If not, control proceeds to step 350. Otherwise, control proceeds to step 330.

In step 330, the wireless router 15 or 17 erases its database entry for the particular wireless device 50 identified in the MRP 60. Control then proceeds to step 350.

In step 350, the value of the propagate variable is decremented by one, and that value is updated in the MRP 60. Control then proceeds to step 360.

In step 360, it is determined whether or not the value of the propagate variable is greater than zero. If it is not, the process described with reference to FIG. 7 then ends. If the value of the propagate variable is greater than zero, control proceeds to step 370.

In step 370, the router 15 or 17 that received the MRP 60 in step 310 sends the MRP 60, including the modified value of the destroy variable, to its next link routers. The process described with reference to FIG. 7 then ends.

Figure 8:
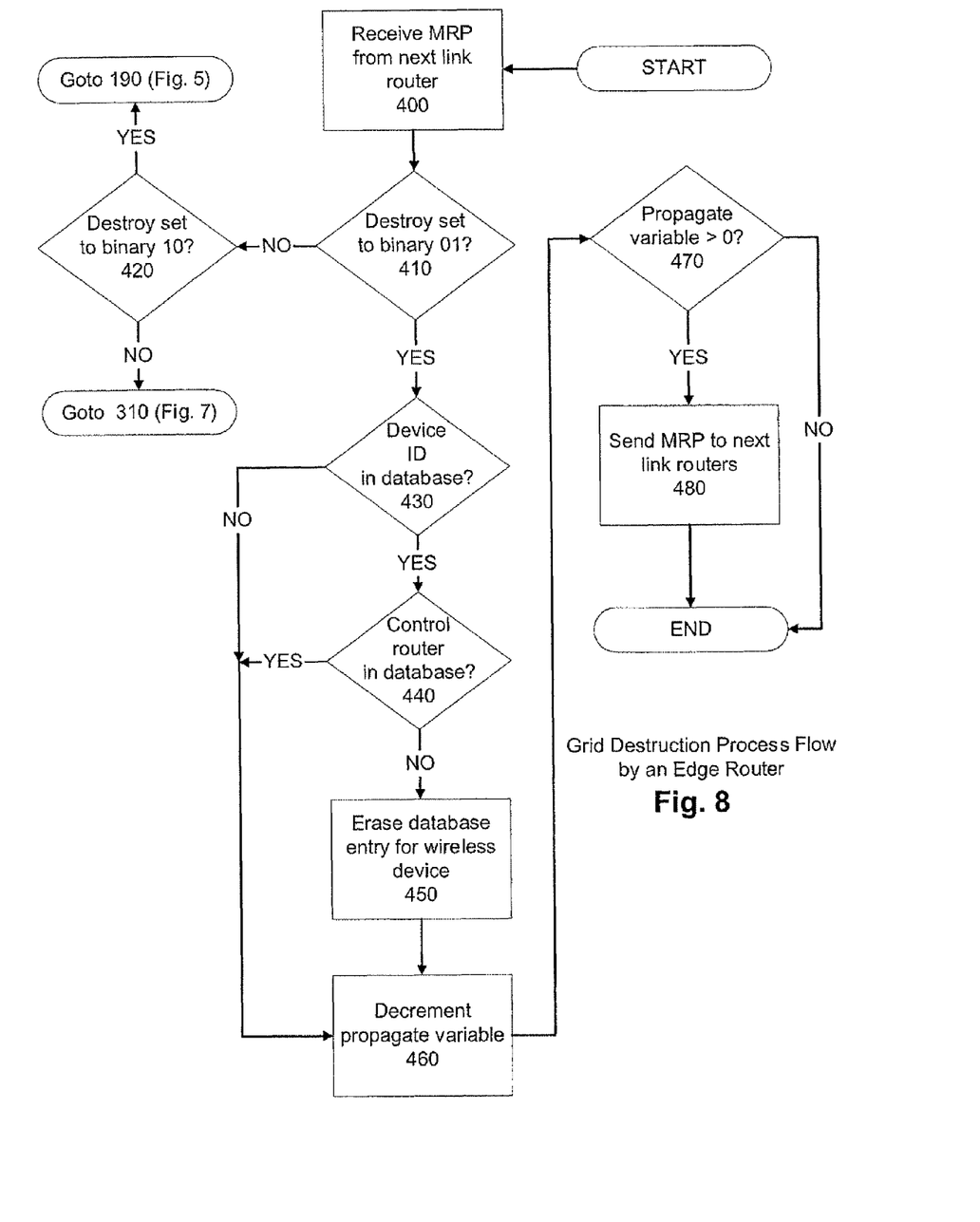
FIG. 8 is a process flow diagram showing the process flow for the clean-up of a wireless networking grid by an edge router, according to an embodiment.

FIG. 8 depicts a process initiated when the destroy field 120 in MRP 60 is set to binary 01. Once a grid 45 is established with respect to a control router as described with reference to FIGS. 4 and 5, the wireless routers 15 and/or 17 at the edge of the grid 45, i.e., edge routers, will have stored propagate values equal to zero for the grid 45. To ensure that wireless routers 15 and/or 17 in wireless network 10 do not waste resources keeping track of wireless devices 50 for which they are not part of a grid 45, the process of FIG. 8 is invoked. In essence this process is a "clean-up" process that entails removing entries about wireless device 50 from routers 15 and/or 17 that are not part of a newly established, i.e., current, grid 45 around the wireless device 50. This process advantageously frees memory and other resources at wireless routers 15 and/or 17 not part of a grid 45.

In step 400, a router 15 or 17 receives an MRP 60 from a next link router. Control then proceeds to step 410.

In step 410, it is determined whether the destroy field 120 in the MRP 60 is set to binary 01. If not, control proceeds to step 420. If so, control proceeds to step 430.

In step 420, it is determined whether the destroy field 120 in the MRP 60 is set to binary 10. If so, control proceeds to step 190, shown in FIG. 5. If not, control proceeds to step 310 in FIG. 7.

In step 430, the router 15 or 17 that received the MRP 60 in step 400 checks to see if the device 50 identified in the MRP 60 is in its database. If not, control proceeds to step 460. Otherwise, control proceeds to step 440.

In step 440, the router 15 or 17 that received the MRP 60 in step 400 checks to see if the database lists the router 15 or 17 identified as the control router in fields 70 and/or 80 of the MRP 60 as the control router for the wireless device 50. If fields 70 and/or 80 of the MRP 60 are listed in the database maintained by the router 15 or 17, control proceeds to step 460. Otherwise, control proceeds to step 450.

Control reaches step 450 if the device 50 identified in the MRP 60 is listed in the database of the router 15 or 17 that received the MRP 60 in step 400, but the router 15 or 17 identified as the control router in fields 70 and/or 80 of the MRP 60 as the control router for the wireless device 50 is not. Therefore, in step 450, the wireless router 15 or 17 that received the MRP 60 in step 400 erases its database entry for the particular wireless device 50 identified in the MRP 60. Control then proceeds to step 460.

In step 460, the value of the propagate variable stored in the router 15 or 17 that received the MRP 60 in step 400 is decremented by one, and that value is updated in the MRP 60. Control then proceeds to step 470.

In step 470, it is determined whether or not the value of the propagate variable is greater than zero. If it is not, then the process described with reference to FIG. 8 ends. However, if the value of the propagate variable is greater than zero, control proceeds to step 480.

In step 480, the router 15 or 17 sends the MRP 60 to all of its next link routers. Following step 370, the process described with respect to FIG. 8 ends.

IV. CONCLUSION

The above description is intended to be illustrative and not restrictive. Many embodiments and applications other than the examples provided would be apparent to those of skilled in the art upon reading the above description. The scope of the invention should be determined, not with reference to the above description, but should instead be determined with reference to the appended claims, along with the full scope of equivalents to which such claims are entitled. It is anticipated and intended that future developments will occur in the field of wireless networking, and that the disclosed systems and methods will be incorporated into such future embodiments. Accordingly, it will be understood that the invention is capable of modification and variation and is limited only by the following claims.

What is claimed is:

1. A method, comprising:
receiving, in a router, from a wireless device, an address of the wireless device; sending, from the router, to the wireless device, an address of the router;
determining that the router is an edge router in a wireless network that services the wireless device; and
establishing the router as a new control router for the wireless device;
determining, in an existing control router, that a wireless grid, maintained by the existing control router for the wireless device, should be destroyed;
determining that an identifier for the wireless device exists in a database associated with the existing control router;
erasing the identifier from the database; and
sending, from the existing control router to at least one next link router, a message that the wireless grid should be destroyed.

2. The method of claim 1, further comprising: before determining that the router is an edge router, notifying an existing control router that the router is in communication with the wireless device.

3. The method of claim 1, further comprising: sending, from the router, to a wireless border gateway, a notification that the router is the new control router for the wireless device.

4. The method of claim 1, further comprising: sending, from the router, a message that includes the address of the router and the address of the wireless device to at least one next link router.

5. The method of claim 1, wherein the determining that the wireless grid should be destroyed is based on at least one of an amount of time that has passed since a last message from the wireless device and a message indicating that the wireless grid should be destroyed.

6. A system, comprising a router configured to:
receive, from a wireless device, an address of the wireless device;
send, to the wireless device, an address of the router;
determine that the router is an edge router in a wireless network that services the wireless device; and
establish the router as a new control router for the wireless device;
determine that a wireless grid, maintained by the existing control router for the wireless device, should be destroyed;
determine that an identifier for the wireless device exists in a database associated with the existing control router;
erase the identifier from the database; and
send, to at least one next link router, a message that the wireless grid should be destroyed.

7. The system of claim 6, the router further configured to notify, before determining that the router is an edge router, an existing control router that the router is in communication with the wireless device.

8. The system of claim 6, the router further configured to send, to a wireless border gateway, a notification that the router is the new control router for the wireless device.

9. The system of claim 6, the router further configured to send a message that includes the address of the router to at least one next link router.

10. The system of claim 6, wherein the determining that the wireless grid should be destroyed is based on at least one of an amount of time that has passed since a last message from the wireless device and a message indicating that the wireless grid should be destroyed.

* * * * *